United States Patent [19]

White

[11] Patent Number: 5,625,854

[45] Date of Patent: Apr. 29, 1997

[54] SHIELD FOR PROTECTING CAMERA EQUIPMENT

[76] Inventor: Samuel White, 27 Arthur Ter., Hackettstown, N.J. 07840

[21] Appl. No.: 549,956

[22] Filed: Oct. 30, 1995

[51] Int. Cl.⁶ .......................... G03B 29/00; G03B 17/02
[52] U.S. Cl. ................................... 396/429; 396/535
[58] Field of Search .................... 354/81, 287, 288

[56] References Cited

U.S. PATENT DOCUMENTS

| | | | |
|---|---|---|---|
| 4,176,701 | 12/1979 | Welgan | 150/52 |
| 4,315,680 | 2/1982 | Gunderson | 354/195 |
| 4,927,017 | 5/1990 | Easter | 206/316.2 |
| 5,115,263 | 5/1992 | Bernhardt et al. | 354/81 |
| 5,394,208 | 2/1995 | Campbell | 354/75 |
| 5,456,277 | 10/1995 | Pontius, Jr. | 135/90 |

*Primary Examiner*—Safet Metjahic
*Assistant Examiner*—Daniel Chapik
*Attorney, Agent, or Firm*—Thomas L. Adams

[57] ABSTRACT

A shield for protecting camera equipment has a hood and a support. The hood is open at a forward end and an aft end and has a self-supporting shape. The support is adapted to be attached to the camera equipment and can support the hood. The hood extends from the support to shield the camera equipment fore and aft of said support means.

17 Claims, 2 Drawing Sheets

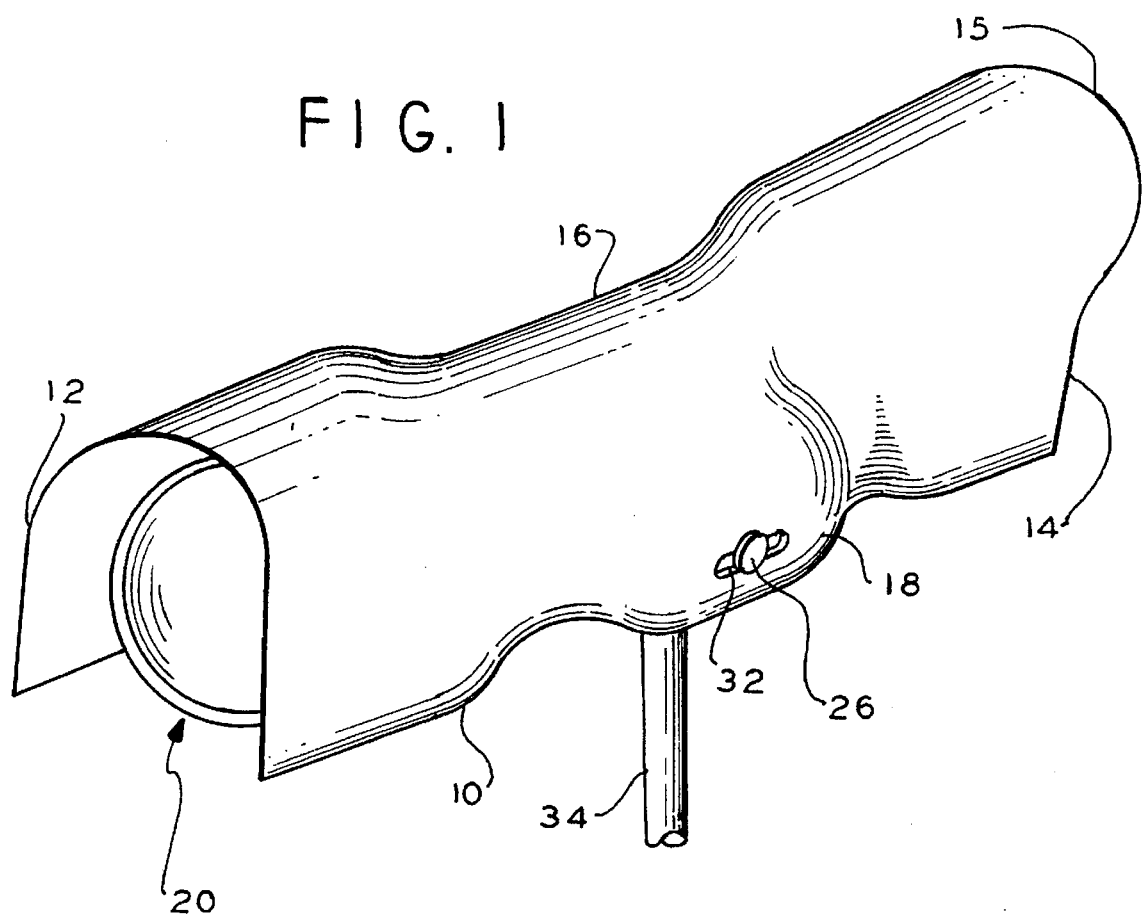
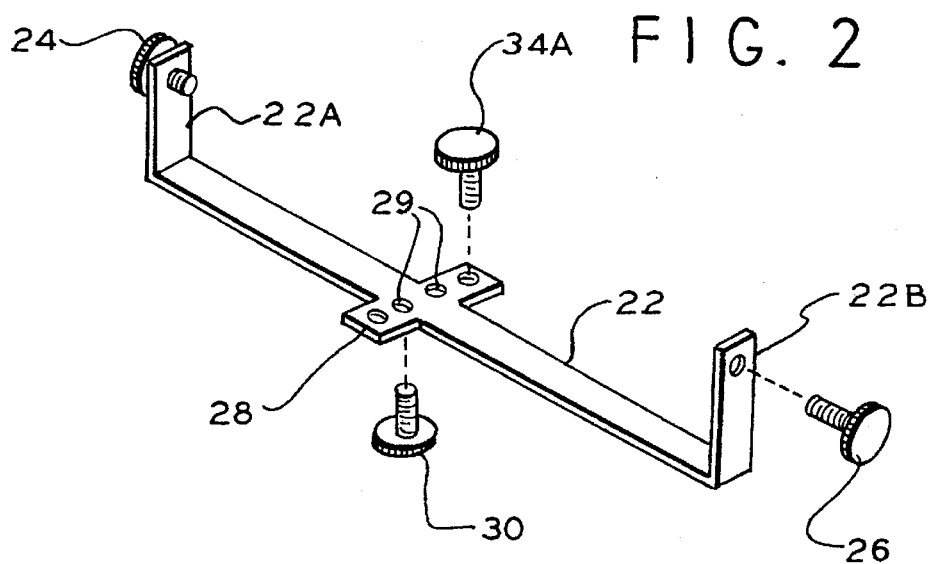

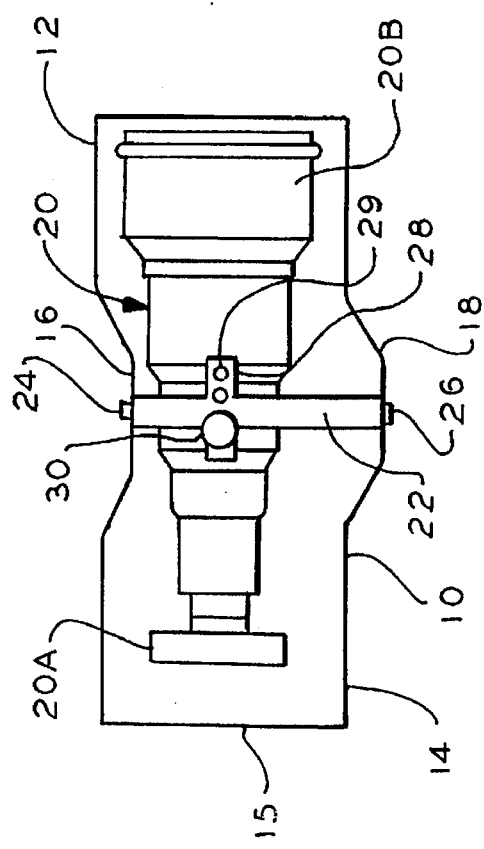
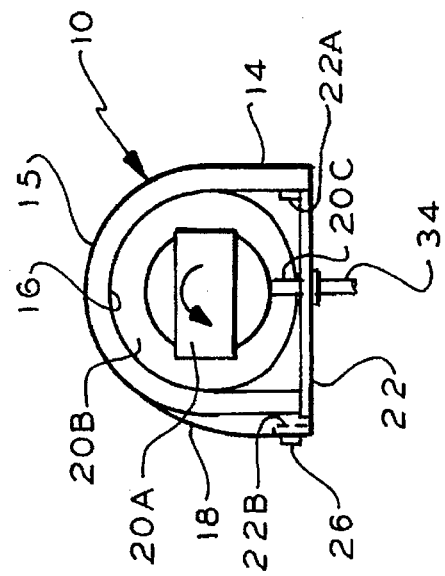
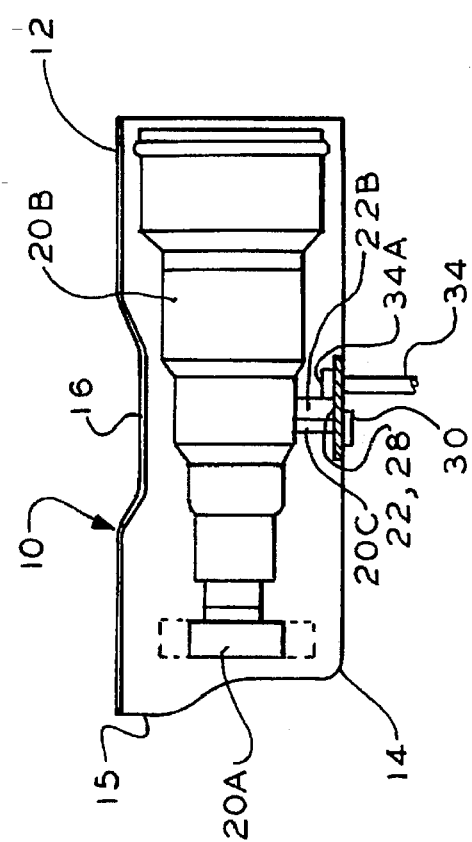

SHIELD FOR PROTECTING CAMERA EQUIPMENT

BACKGROUND OF THE INVENTION

1. Field of the Invention

The present invention relates to shields for camera equipment and in particular to a hood that is open at a forward and an aft end.

2. Description of Related Art

Professional photographers employed by newspapers or magazines normally employ sophisticated and expensive camera equipment. The camera equipment may include a motorized camera body attached to a large aperture, telephoto lens. Other professionals may employ relatively large video cameras that are also relatively large and expensive.

When using such camera equipment outdoors at, for example, sporting events, the equipment needs to be protected from inclement weather. Moisture from rain or snow can damage the equipment. Also moisture trapped inside the equipment can distort the images captured by the camera equipment.

Sports photographers have placed their camera equipment in plastic bags to shield against inclement weather. The floppy nature of a plastic bag can interfere with efficient use of the camera equipment. Folds of the bag can restrict manual access to important parts of the camera equipment or can become entangled with the camera equipment or the camera operator. Also, bags have a tendency to vibrate and become mishaped in windy conditions. Furthermore, floppy enclosures provide no protection against accidental impacts.

Others have tried to customize the shape and structure of a protective bag. For example in U.S. Pat. No. 4,751,950, a bag-like protector is open at the forward end and has rear hole designed to be secured at a camera view finder. A slit on the underside of the protector allows manual access. This design has most of the disadvantages previously noted for ordinary plastic bags, namely, interference with manual access, likelihood of entanglement, etc. For a related design for a video camera see U.S. Pat. No. 4,927,017.

A bag-like camera case for underwater photography is shown in U.S. Pat. No. 3,036,506. A six sided, waterproof box for holding a camera is shown in Design Patent 334,397. For other bag-like devices for protecting a camera see U.S. Pat. Nos. 4,033,392; and 4,176,701.

U.S. Pat. No. 3,977,113 shows a mesh-like guard for the telescopic sight of a gun. This guard has a front and rear bracket for attachment to the gun. This mesh design does not protect from inclement weather. Also, the attachment brackets at opposite ends are highly disadvantageous for attachment to camera equipment.

For shades that attach to the end of lenses or sights, see U.S. Pat. Nos. 4,089,117; 5,095,327; and 5,181,140. Other devices that attach to the end of a lens are shown in U.S. Pat. Nos. 4,415,242; and 4,909,617. Visors are shown for computer monitors in U.S. Pat. Nos. 4,784,468; 5,115,345; and 5,233,468. Various visors and shields for vehicle mirrors are shown in U.S. Pat. Nos. 2,989,896; 5,165,745; 5,331,461; and 5,421,628.

SUMMARY OF THE INVENTION

In accordance with the illustrative embodiments demonstrating features and advantages of the present invention there is provided a shield for protecting camera equipment with a hood and a support means. The hood is open at a forward end and an aft end. The hood has a self-supporting shape. The support means is adapted to be attached to the camera equipment for supporting the hood. the hood extends from the support means to shield the camera equipment fore and aft of the support means.

By employing such apparatus an improved shield is provided for camera equipment. In a preferred embodiment, a plastic hood is designed to arch over the camera equipment. The hood is mounted on a transverse bracket that spans across the underside of the hood. The camera equipment can be attached atop the bracket and a tripod or monopod can attach to the bracket as well. Having a self-supporting shape (or being rigid) and being centrally supported, the hood is very effective for shielding expensive, sophisticated camera equipment. The hood 25 provides an effective shield from inclement weather.

In a preferred embodiment, the hood is open on the underside, the front and rear. The preferred shape has a narrowed midsection providing in part, an hour-glass-like shape. The open aft end of the hood has an overhanging visor to shade the camera operator's eyes. Also, the plastic material is preferably transparent or translucent, and the operator ought to be able to examine the settings of the camera equipment by peering through the hood.

Preferably, the hood will be mounted to allow a limited amount of longitudinal adjustment relative to the camera equipment. This will account for different sizes and types of camera equipment.

BRIEF DESCRIPTION OF THE DRAWINGS

The above brief description as well as other objects, features and advantages will be more fully appreciated by reference to the following detailed description, when taken in conjunction with the accompanying drawings wherein:

FIG. 1 is an axonometric view of a shield in accordance with the principles of the present invention;

FIG. 2 is an axonometric view, partially exploded, of the support means of FIG. 1;

FIG. 3 is an aft end view of the shield of FIG. 1;

FIG. 4 is a right side view of the shield of FIG. 1 with half of the hood broken away to reveal the camera equipment; and FIG. 5 is a bottom view of FIG. 1's shield.

DETAILED DESCRIPTION OF THE PREFERRED EMBODIMENTS

Referring to FIGS. 1–5, a shield is shown having a hood 10. Hood 10 is preferably made of a molded transparent thermoplastic having a saddle-like shape, especially around midsection 16. Along most of its length, hood 10 has an transverse cross-section with an inverted U-shape. While the illustrated hood 10 arches arcuately, in other embodiments the hood may have a rectangular or polygonal cross-section.

Hood 10 is open at forward end 12 and aft end 14. In the vicinity of ends 12 and 14, hood 10 is 8 inches (20 cm) high and 8 inches (20 cm) wide, in this preferred embodiment. In this embodiment, the height of midsection 16 is 6 inches (15 cm), that is, recessed 2 inches (5 cm). Also, in this preferred embodiment, the right side of the midsection 16 was recessed 2 inches (5 cm) as well.

The left side of midsection 16 is similarly recessed except for the bulging of distended skirt 18. Skirt 18 interrupts the otherwise planar symmetry of hood 10. In a symmetrical form, hood 10 has a saddle-like shape, or a shape like a portion of an hourglass.

Skirt 18 is sized to allow manual access to camera equipment 20 under hood 10. Skirt 18 is shown located on the left side of midsection 16, thereby allowing left handed access. In other embodiments the distended skirt may be on the right side to allow right handed access. Alternatively, a pair of distended skirts may be employed on opposite sides of midsection 16 to allow manual access from either side.

The overall length of hood 10 is 26 inches, although other lengths are contemplated for camera equipment of various types. For example, some still cameras may have relatively large or relatively small lenses and therefore may require different sized hoods. Similarly, video cameras can be relatively large overall and therefore may require a generally larger hood.

It is advantageous if hood 10 is longer than the camera equipment 20 and extends beyond the camera equipment at both ends. In those circumstances, hood 10 can be placed end down and touch the ground without allowing the camera equipment 20 to likewise touch the ground.

Hood 10 can have various shapes and may in some cases be semi-cylindrical, or a three-sided, rectangular box. Also, the hood 10 is shown with a lower edge that is low enough to cover the side of camera equipment 20 completely, but in some embodiments the hood may be shorter and will leave exposed the bottom portion of the camera equipment 20. That arrangement is satisfactory since the hood 10 can then simply act as an umbrella-like device to protect the equipment 20 from the elements, but leave it exposed to a greater extent for facilitating manipulation of the equipment 20.

The aft end 14 is shown with an overhanging visor 15. Essentially, the upper portion of aft end 14 is extended about 2 inches (5 cm). This provides additional shading to help the camera operator sight through the camera equipment. In some embodiments, the hood 10 will be transparent or translucent throughout, except for tinting of visor region 15 to enhance the shading effect. The preferred hood will be made of plastic of a thickness to allow the hood to keep its shape, but tolerate limited amonts of flexing. This is referred to as a self-supporting shape. In some embodiments the hood may be rigid.

A support means, shown separately in FIG. 2, is a U-shaped bracket having a flat, lower transverse bar 22 terminating in two upright arms 22A and 22B. Threaded holes in the upper ends of arms 22A and 22B accept threaded knobs 24 and 26, respectively.

Transverse bar 22 has a cruciform midsection, comprising a longitudinally extending, flat bar 28 having four threaded holes 29. Holes 29 can be used to attach various devices using, for example, threaded attachment devices 30 and 34A. Bar 28 with its holes 29 may be used as a means for longitudinally adjusting the relative position between hood 10 and camera equipment 20, in a manner to be described presently. The threaded knobs 24 and 26 may also be used as such a means for longitudinally adjusting, in a manner also to be described presently.

Transverse bar 22 is positioned inside midsection 16 of hood 10 with arms 22A and 22B adjacent to longitudinal slots 32. One of the slots 32 is visible in FIG. 1 and the other complimentary slot (not shown) is located directly opposite on the right side of midsection 16. Thus aligned, threaded knobs 24 and 26 can be threaded through the slots 32 to secure hood 10 to the arms 22A and 22B of bracket 22.

Threaded holes 29 can be used for attaching separate devices to transverse bar 22. For example, camera equipment 20 can be attached to one of the four holes 29, while a supporting structure such as the illustrated monopod 34 can connect to a different one of the holes 29.

Camera equipment 20 is illustrated herein as a camera body 20A secured to a large aperture, telephoto lens 20B. It will be appreciated equipment other than a still camera can be used, such as a video camera or motion picture cameras, or other types of cameras.

To facilitate an understanding of the principles associated with the foregoing apparatus, its operation will be briefly described. The shield may be sold with the bracket 22 attached to slots 32 as illustrated in FIG. 1. The user can then install camera equipment 20 by attaching lens 20B through fixture 20C to bracket 22. The lens may be installed with hood 10 left attached to bracket 22, but in some cases hood 10 may be removed from bracket 22 to ease installation of lens 20B.

The lens 20B and fixture 20C may be bolted in place on longitudinal bar 28 of bracket 22 by screwing threaded knob 30 (FIG. 2) through one of the holes 29 into fixture 20C (FIGS. 3 and 4). By choosing different holes 29, the position of bracket 22 and thus hood 10 may be shifted relative to lens 20B.

Additional adjustment of hood 10 relative to bracket 22 and camera equipment 20 is achieved by virtue of longitudinally disposed slots 32. Specifically, the user may loosen threaded handles 24 and 26 to allow the hood 10 to shift longitudinally relative to the bracket 22 and camera equipment 20.

Thereafter, the monopod 34 (or in some cases a tripod) may be installed on the longitudinal bar 28 of bracket 22 by screwing threaded knob 34A (FIG. 2) through one of the holes 29 and into the top of the monopod 34 (FIG. 4).

Once assembled, the camera equipment 20 may be used in the usual fashion. The camera operator can lift the assembly by grasping monopod 34 and steadying the assembly by grasping either hood 10 or bracket 22 with the other hand. To take a picture, monopod 34 is planted in the usual fashion and the camera operator can insert a hand under distended skirt 18. This allows manipulation of various rings on the lens 20B. Thus the camera operator can in the usual fashion focus, change aperture, etc.

Also, the aft end 14 is sufficiently large to allow the camera body 20A to rotate 90°, as shown in FIGS. 3 and 4. The camera body 20A is shown with a horizontal alignment, while a vertical alignment is shown in phantom in FIG. 4. In embodiments where the visor 15 is tinted, the operator's eyes will be thereby shaded when using camera body 20A.

Because of this overall configuration, the camera equipment 20 will be protected from inclement weather such as rain, snow, etc. Also, the hood 10 provides some shielding from accidental impacts. Significantly, the hood 10 is not a bag-like device. Thus hood 10 does interfere with manipulation of the camera equipment 20, since hood 10 has a self-supporting shape and stays in well defined positions.

It is to be appreciated that various modifications may be implemented with respect to the above described preferred embodiments. For example, the illustrated bracket for supporting the hood and camera equipment can take alternate shapes. In some instances more than one bracket may be used at various stations along the midsection of the hood. In some embodiments a slot may be formed on the support bracket, instead of the hood and still allow longitudinal adjustment of the hood relative to the camera equipment. Also alternate fasteners can be used on the bracket in place of the illustrated threaded knobs.

Obviously, many modifications and variations of the present invention are possible in light of the above teachings. It is therefore to be understood that within the scope of the appended claims, the invention may be practiced otherwise than as specifically described.

I claim:

1. A shield for protecting camera equipment comprising:
   a hood open at a forward end and an aft end and having a self-supporting shape; and
   a support means adapted to be attached to said camera equipment for supporting said hood, said hood extending from said support means to shield said camera equipment fore and aft of said support means.

2. A shield according to claim 1, wherein said cover has an arching shape, sized to straddle said camera equipment.

3. A shield according to claim 1, wherein said cover has a portion with a saddle-like shape.

4. A shield according to claim 1, wherein said hood has a distended skirt sized to allow manual access to said camera equipment under said hood and to provide hand clearance between said hood and said camera equipment.

5. A shield according to claim 4, wherein said hood is open underneath.

6. A shield according to claim 1, wherein said camera equipment includes a camera body, and wherein said aft end of said hood is sized to provide clearance to allow the camera body to rotate at least 90° with respect to said hood.

7. A shield according to claim 1, wherein said hood is longer than the camera equipment.

8. A shield according to claim 1, wherein said aft end of said hood has an overhanging visor.

9. A shield according to claim 8, wherein said hood is at least partially translucent.

10. A shield according to claim 1, wherein said solid hood is at least partially translucent.

11. A shield according to claim 1, wherein said support means includes means for longitudinally adjusting the relative position between said hood and said camera equipment.

12. A shield according to claim 1, wherein said support means includes means for longitudinally adjusting the relative position between said hood and said support means.

13. A shield according to claim 12, wherein said hood has a central pair of longitudinal slots on opposite sides of said hood, said support means being adjustably attached to said hood at said slots.

14. A shield according to claim 13, wherein said support means comprises a U-shaped bracket.

15. A shield according to claim 1, wherein said support means comprises:
    a lower transverse bar centrally spanning said hood.

16. A shield according to claim 15, wherein said lower transverse bar has a cruciform midsection.

17. A shield according to claim 1, wherein said camera equipment includes a tripod or monopod, and wherein said support means is adapted to be attached to either the tripod or the monopod.

* * * * *